Oct. 6, 1970 R. D. BATSON ET AL 3,532,873
APPARATUS FOR MONITORING LIGHT SOURCE OPERATION
Filed Oct. 27, 1967

INVENTORS.
Robert D. Batson
Richard H. Mayer
BY
John R. Faulkner
E. Dennis O'Connor
ATTORNEYS

… … .

United States Patent Office 3,532,873
Patented Oct. 6, 1970

3,532,873
APPARATUS FOR MONITORING LIGHT SOURCE OPERATION
Robert D. Batson, Detroit, and Richard H. Mayer, Dearborn, Mich., assignors to Ford Motor Company, Dearborn, Mich., a corporation of Delaware
Filed Oct. 27, 1967, Ser. No. 678,599
Int. Cl. B60q 1/04; G08b 5/00
U.S. Cl. 240—8.4     5 Claims

ABSTRACT OF THE DISCLOSURE

Apparatus for monitoring the operation of a plurality of light sources. The apparatus includes a plurality of light pipes utilized to transmit light from each of the monitored light sources and means for coloring the light transmitted by each of the light pipes a different color, such that a combination of the colored light forms white light. The light transmitted by the plurality of light pipes is intermingled and transmitted by a single light pipe to a viewing station. Upon the termination of operation of one or more of the light sources, the intermingled light transmitted by the single light pipe and observable at the viewing station no longer is white, thus indicating a light source failure.

BACKGROUND OF THE INVENTION

It is known in the motor vehicle art to promote traffic safety by providing motor vehicles with warning indicators that call to the attention of the vehicle operator the failure of vehicle running or signal lamps, such as headlights, taillights, and brake lights. Such warning indicators have been designed to utilize flexible light transmitting tubes known in the art as "light pipes." The light pipes are used to transmit light from the monitored vehicle lamp to the vehicle passenger compartment to indicate normal lamp operation. An example of such a warning indicator is disclosed by U.S. Pat. 2,198,443, issued Apr. 23, 1940.

A feature of conventional warning indicators of this type is the utilization of one light pipe to transmit light from each monitored lamp to the vehicle passenger compartment. At the end of each of these light pipes remote from the light monitored is located a viewing means permitting the operator to determine if the individual lamps are operating normally by observing if the light pipes are transmitting light. Conventionally, these viewing means comprise the end of the light pipes secured to the vehicle instrument panel. If the normal vehicle complement of lamps requiring monitoring are accommodated, however, the plurality of the light pipe ends secured to the vehicle instrument panel for observation leads to a confusing plethora of indicators to be observed and adds to the burden of visual impressions a motor vehicle operator must take into account during vehicle operation. Also, such a plurality of indicators may contribute to a cluttered instrument panel appearance and thus detract from an otherwise aesthetically pleasing instrument panel design.

It is an object of this invention to provide apparatus for monitoring the operation of a plurality of light sources, and particularly motor vehicle lamps positioned about the exterior of the vehicle body structure. The apparatus of this invention utilizes light pipes to transmit light from the monitored lamps but includes only a single indicator to allow an inspection of multiple lamp operation.

SUMMARY OF THE INVENTION

Apparatus constructed in accordance with this invention for monitoring the operation of a plurality of light sources, and in particular the running lights of a motor vehicle having an instrument panel, includes light coloring means for coloring the light emitted from each of the running lights a distinct color such that the combination of colored light forms light of a predetermined color. Light collecting means gather the light colored by the light coloring means and this gathered light is intermingled by light combining means to form light of the predetermined color. Light conducting means transmit the light of predetermined color to the vehicle instrument panel for viewing by the vehicle operator. In this manner the light intermingled by the light combining means will cease to have the predetermined color upon the termination of operation of one or more of the monitored light sources.

DETAILED DESCRIPTION OF THE INVENTION

Figure 1:
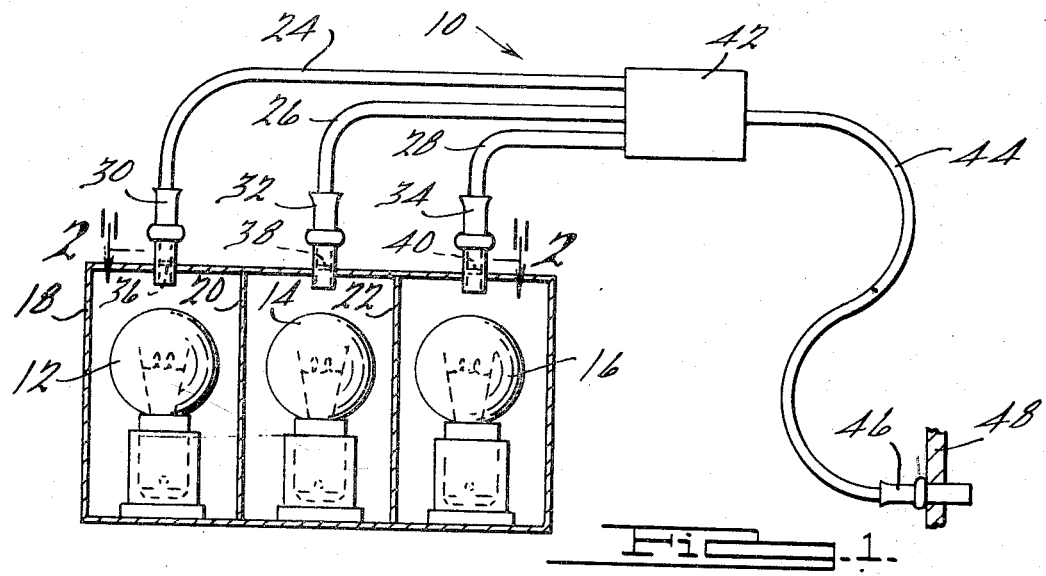
FIG. 1 is a schematic representation of apparatus for monitoring light source operation constructed in accordance with this invention.
Figure 2:
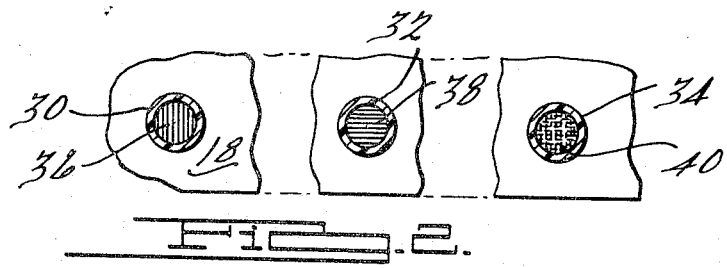
FIG. 2 is a sectional view taken along the line 2—2 of FIG. 1.

Referring now in detail to the drawing, and in particular to FIGS. 1 and 2, the numeral 10 denotes generally apparatus constructed in accordance with a first embodiment of this invention and illustrated schematically as monitoring the operation of motor vehicle running lamps 12, 14 and 16. These lamps are illustrated in close proximity for illustrative purposes only, as it readily may be appreciated that lamps 12, 14 and 16 may be located at widely diverse portions of the motor vehicle body. For example, lamps 12, 14 and 16 may represent a headlight, taillight, and license plate illumination light of a vehicle. Also, it is to be understood that the device 10 may be utilized to monitor any number of lamps as will be explained in detail below.

Vehicle lamps 12, 14 and 16 are schematically illustrated as supported by motor vehicle body structure 18 and separated by opaque body panels 20 and 22. Light conducting plastic fiber light pipes 24, 26 and 28, having mounting sleeves 30, 32 and 34, respectively, at one end of said pipes to facilitate mounting thereof, are arranged such that each one of said pipes has one end thereof exposed to the light emitted from one of said lamps. In this manner, each one of said pipes will transmit light from one of said lamps along the length of said one pipe. Plastic fiber light pipes that will function satisfactorily in this apparatus are available commercially as "CROFON" light guides. Other types of light pipes, such as those constructed from glass material, also will function satisfactorily as part of this apparatus.

A red light filter 36 is mounted within mounting sleeve 30 and colors the light emitted from lamp 12 red prior to transmission of this light along the length of light pipe 24. A blue light filter 38 and a yellow light filter 40 are mounted in mounting sleeves 32 and 34, respectively, and color the light emitted by lamp 14 blue and the light emitted from lamp 16 yellow prior to the transmission of this light along the length of light pipes 26 and 28.

It may be seen from the drawing that light pipes 24, 26 and 28 transmit the light from lamps 12, 14 and 16 to a light pipe connector 42. Such a connector is fully illustrated and described in copending U.S. application Ser. No. 678,601, filed on even date with this application and assigned to the assignee of this application. It is sufficient to say, for purposes of this disclosure, that light pipe connector 42 optically connects light pipes 24, 26 and 28 with a single light pipe 44 so that the light transmitted along the plurality of light pipes 24, 26 and 28 is intermingled and transmitted along the light pipe 44.

As discussed above, filters 36, 38 and 40 color the light transmitted in light pipes 24, 26 and 28 red, blue and yellow. It is well known that a combination of light of these colors forms white light. Since the light transmitted by light pipes 24, 26 and 28 is intermingled and transmitted along the length of light pipe 24, it follows that the light transmitted by light pipe 44 is white light.

If more or less than three lamps illustrated were to be monitored by the apparatus of this invention, various colors of filters could be used as part of this apparatus. The only parameter for the color of filters used however, is that the combination of the total light passing through these filters produces light of a predetermined color. The white light described above as being this predetermined color is cited for purposes of illustration and is convenient in an application of this invention.

The end of light pipe 44 remote from light pipe connector 42 has mounted thereon a mounting sleeve 46 connecting light pipe 44 to an instrument panel 48 of a motor vehicle. It thus may be seen that the end of light pipe 44 inserted in mounting member 46 registers with a portion of the motor vehicle interior defined in part by instrument panel 48. A motor vehicle operator located within the vehicle passenger compartment thus may determine, by a visual inspection, the color of light transmitted along the length of light pipe 44.

As described above, when lamps 12, 14 and 16 are operating satisfactorily and emitting light, the light within light pipe 44 will be colored white. Upon the termination of operation of one or more of the lamps 12, 14 and 16, however, a portion of the colored light cooperating to form the white light pipe 44 will not be transmitted along one or more of the light pipes 24, 26 and 28. Thus the light in light pipe 44 will not be white and this change of color will give a positive visual indication to the operator of the motor vehicle that one or more of the lamps 12, 14 and 16 is inoperative.

Figure 3:
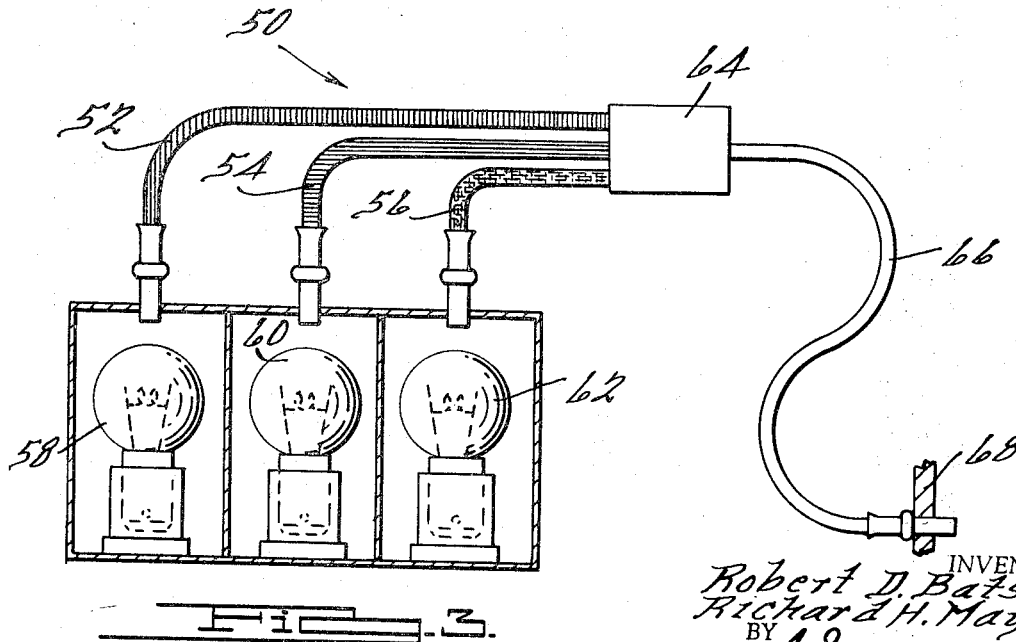
FIG. 3 is a view similar to FIG. 1 but showing an alternate embodiment of this invention.

FIG. 3 illustrates an alternate embodiment of this invention wherein the plurality of light pipes 52, 54 and 56 are used to transmit light from lamps 58, 60 and 62, respectively, to a light pipe connector 64. Light pipe 66 transmits the light from pipes 52, 54 and 56 that has been intermingled by connector 64. Light pipes 52, 54 and 56 are themselves colored as illustrated so that a combination of the light transmitted by these three light pipes forms white light that may be observed by a motor vehicle operator glancing at the indicating end of light pipe 66 mounted in a motor vehicle instrument panel 68. The colored materials used to form light pipes 52, 54 and 56 obviate the need for distinct light filters as the light from lamps 58, 60 and 62 entering into these three light pipes will be colored during its transmission along the length of these pipes. In all other manners, the embodiment of the invention illustrated in FIG. 3 functions identically to the embodiment of the invention illustrated in FIGS. 1 and 2.

It thus may be seen that this invention provides apparatus enabling a plurality of light sources, in particular motor vehicle running lamps, to be monitored by transmission of light from these light sources to an indicating point within the motor vehicle passenger compartment by means of light pipes. This invention further provides that although a plurality of light sources are monitored by the apparatus of this invention, only a single indicator within the vehicle passenger compartment is required, and that by observation of this single indicator a motor vehicle operator may easily determine the occurrence of a lamp failure.

We claim:
1. Apparatus for monitoring the operation of a plurality of running lights of a motor vehicle having an instrument panel and indicating the failure of one or more of said lights, said apparatus comprising: light coloring means for coloring light emitted from each of said running lights a distinct color such that the combination of the colored lights forms light of a predetermined color, light collecting means for gathering the light colored by said light coloring means, light combining means intermingling the light gathered by said light collecting means to form light of said predetermined color, and light conducting means transmitting the light of predetermined color to said instrument panel for viewing by a vehicle operator, whereby the light intermingled by said light combining means will cease to have said predetermined color upon the termination of operation of one or more of said running lights.

2. Apparatus according to claim 1, wherein said light collecting means comprises a plurality of light pipes, one end of each of said light pipes arranged proximate one of said running lights.

3. Apparatus according to claim 2, wherein said light conducting means comprises a single light pipe optically connected to said plurality of light pipes and transmitting the light conducted by said plurality of light pipes.

4. Apparatus for monitoring the operation of a plurality of simultaneously operated light sources and indicating the failure of one or more of said light sources, said apparatus comprising: light coloring means for coloring light emitted from each of said light sources a distinct color such that the combination of the colored lights forms light of a predetermined color, light collecting means for gathering the light colored by said light coloring means and consisting of a plurality of light pipes, one end of each of said light pipes arranged proximate one of said light sources, light combining means intermingling the light gathered by said light collecting means to form light of said predetermined color, and light conducting means transmitting the light of predetermined color to a viewing station for optical scouting, whereby the light intermingled by said light combining means will cease to have said predetermined color upon the termination of operation of one or more of said running lights.

5. Apparatus according to claim 4, wherein said light conducting means comprises a single light pipe optically connected to said plurality of light pipes and transmitting the light conducted by said plurality of light pipes.

References Cited

UNITED STATES PATENTS

| 2,198,443 | 4/1940 | Paul et al. | 240—8.41 |
| 2,589,569 | 3/1952 | Peter et al. | 240—1 XR |
| 2,686,866 | 8/1954 | Williams | 240—3.1 |
| 2,689,948 | 9/1954 | Rothman | 240—1 XR |
| 3,302,012 | 1/1967 | Reppisch | 240—1 XR |

NORTON ANSHER, Primary Examiner

D. S. STALLARD, Assistant Examiner

U.S. Cl. X.R.

240—1; 340—380